United States Patent [19]
Friedel et al.

[11] 3,822,059
[45] July 2, 1974

[54] FLAME CUTTING MACHINE

[75] Inventors: Karlo Friedel, Russelsheim; Erich Neander, Weisskirchen/Taunus; Hans Kleist, Herborn, all of Germany

[73] Assignee: Messer Griesheim GmbH, Frankfurt/Main, Germany

[22] Filed: Apr. 9, 1973

[21] Appl. No.: 349,476

[30] Foreign Application Priority Data
Apr. 20, 1972   Germany............................ 2219181

[52] U.S. Cl. ........... 266/23 K, 266/23 C, 266/23 L, 266/23 R
[51] Int. Cl. ................................................ B23k 7/10
[58] Field of Search .... 266/23 R, 23 B, 23 C, 23 D, 266/23 E, 23 K, 23 L

[56]   References Cited
UNITED STATES PATENTS

| 2,361,028 | 3/1953 | Murr | 266/23 C |
| 2,364,645 | 12/1944 | Mott et al. | 266/23 C |
| 3,419,257 | 12/1968 | Roder | 266/23 R |

Primary Examiner—Roy Lake
Assistant Examiner—Paul A. Bell
Attorney, Agent, or Firm—Ernest F. Marmorek

[57]   ABSTRACT

A flame cutting machine includes a torch carriage, a guiding cantilever track supporting and guiding the carriage, and a movable upright guard bar carried by the carriage and supporting a cutting torch. A single structural unit is formed by the guard bar, by a guiding frame that is movably attached to the guard bar, and by a drive motor that is supported on the frame and is in driving connection with the guard bar. The structural unit is insertable as a whole into, and disconnectably secured to, the carriage.

10 Claims, 5 Drawing Figures

FLAME CUTTING MACHINE

BACKGROUND OF THE INVENTION

This invention relates to a flame cutting machine having a guiding track for supporting at least one torch carriage provided with a cutting torch the vertical position of which is adjustable by means of a guide bar arranged within the torch carriage and driven by a motor.

To attain optimum flame cutting results, it is necessary that the cutting torch be held above the work piece to be processed at a predetermined distance. For this purpose, the cutting torch, as mentioned above, has been attached to an upright guard bar which is driven in opposite upright directions by means of a transmission gear driven by a motor. The driving motor can be controlled either manually by an operator or automatically by the aid of an automatically operating sensing device.

It has been known how to make the guard bar which carries the cutting torch (guiding support) in the form of a dovetailed guide. Even if the guide of this type is reliable in operation, it is susceptible to wear and requires a considerable amount of manual fitting work during its manufacture. In addition, the dovetailed guide requires increased driving force to overcome the adhesion friction, especially when it is to be brought from its rest condition into motion.

Another essential disadvantage of the known guiding system for the upright motion of the cutting torch resides in the fact that within the torch carriage it is difficult to assemble the separate guard bar (guiding support), the counterpiece acting as the actual guiding member and driving means, and respectively to detach in the case of a malfunction the above components from the carriage. As each above mentioned part of the guiding system may consist of a plurality of different subcomponents, the installation or replacement of the system becomes a time consuming operation which is proportionally costly.

It is therefore an object of this invention to provide a guiding system which is simple in design and reliable in operation.

Another object of this invention is to provide a guiding system for the cutting torch which forms a compact unit which can be easily installed within or removed from the torch carriage of a flame cutting machine.

SUMMARY OF THE INVENTION

According to this invention, the above objects are attained by combining a guard bar, a guiding frame for upright guiding the guard bar and a driving motor for driving the guard bar, into a single structural unit which as a whole can be readily installed into the torch carriage.

The structural unit of this invention, therefore, can be preassembled independently from the manufacture of the torch carriage, that means all above mentioned components of the structural unit are fitted together and in the final assembly of the machine the structural unit as a whole is simply inserted into the torch carriage. The housing of the torch carriage has a top opening covered by a removable lid and through this opening the entire unit can be easily introduced into the interior of the carriage housing.

Similarly, the attachment of the structural unit to the carrigae can be made very simply by disconnectable screw connections. Upon fastening of the structural unit to the torch carriage all what is needed to be done is to vertically align the structural unit, especially the guard bar, thereof, so that the exact upright position of the cutting torch with respect to the processed work piece be always secured.

In the structural unit of this invention, it is particularly advantageous when the guiding frame defines a guiding portion for holding and guiding the guard bar, and a supporting plate portion for mounting the driving motor. If the guard bar is guided and held by the guiding frame and the driving motor is also attached to the frame there results an extraordinarily compact, space saving and consequently an easily mountable structural unit.

It is also advantageous to provide the guiding portions of the frame with rollers which insure flawless rolling contact with the vertically movable guard bar. Another advantage is attained when the guard bar is guided between two opposite pairs of guide rollers.

To compensate for wear which may occur between the guiding frame and the guard bar due to frequent reciprocating movements of the upright guard bar, it is desired to provide each facing pair of rollers with adjustment means. The adjustability of the guiding rollers has an additional advantage that the maching tolerances which may occur during the production of the guard bar can be compensated without difficulties by resetting the rollers, that means, by adjusting the distance between the facing roller pairs.

To secure a reliable guiding function of the rollers, it is further advantageous that at least one roller in each roller pair is provided with a groove which partially embraces the mating surface of the guard bar.

Another advantage can be attained by providing a guard bar having a hexagonal cross-section whereby an end surface portion which is remote from the torch carrying end of the bar, is provided with a toothed rack adapted for engaging a pinion on the shaft of the driving motor; in this manner the driving force from the motor is transferred to the guard bar with minimum losses.

BRIEF DESCRIPTION OF THE DRAWINGS

For a fuller understanding of the nature and objects of the invention, reference should be had to the following detailed description, taken in connection with the accompanying drawings, in which.

DETAILED DESCRIPTION

Figure 1:
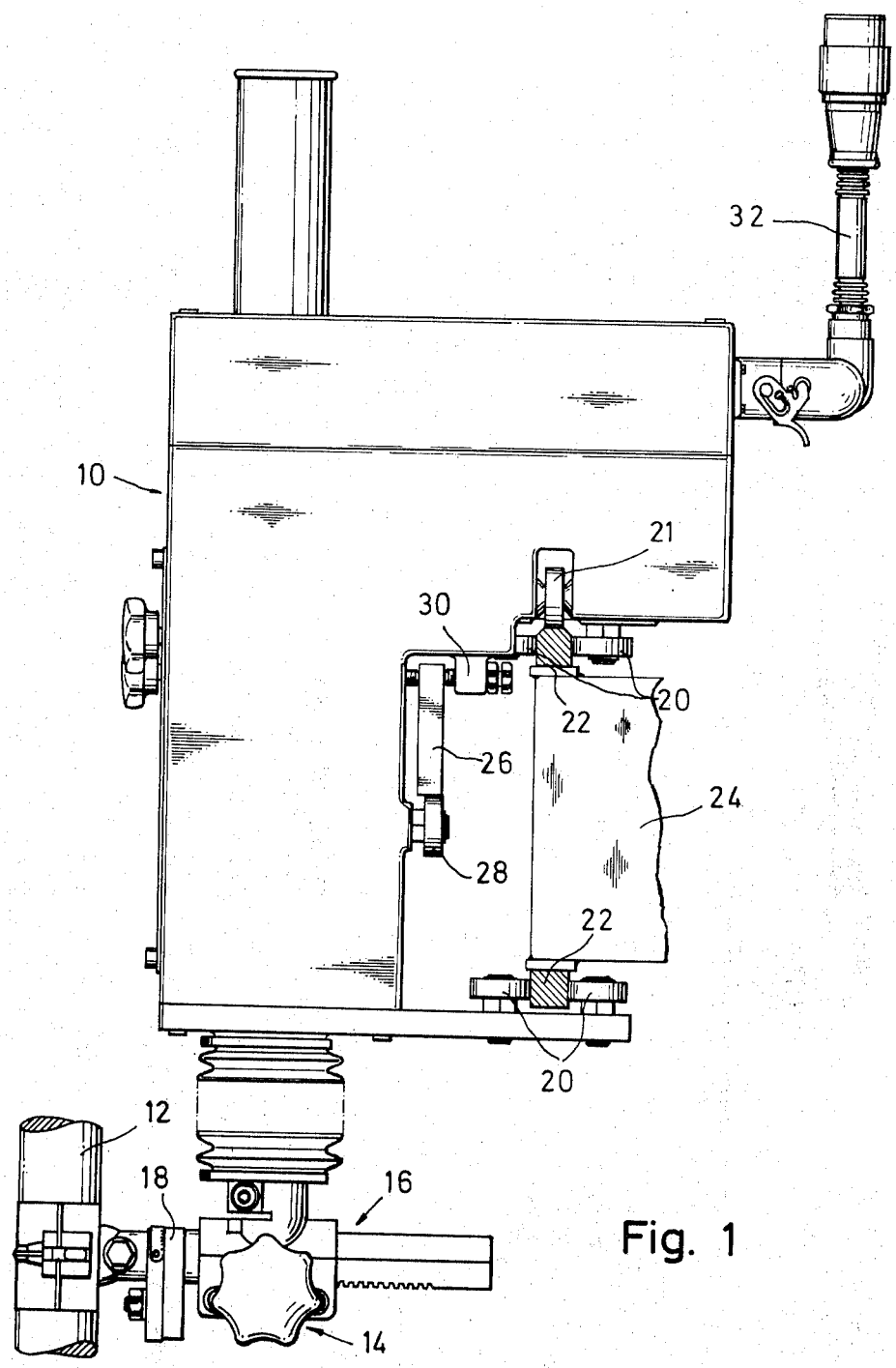
FIG. 1 is a side elevation view of a torch carriage of a flame cutting machine.

FIG. 1 is a general view of a torch carriage 10 carrying a cutting torch 12. The cutting torch 12 is connected to a mounting support 14 which is adjustable by means of a manually operated rack-and-pinion drive 16. The adjustable mounting support 14 makes it possible that the position of the cutting torch 12 can be adjusted in opposite horizontal directions with respect to the flame carriage 10. The mounting support 14 is connected to the cutting torch 12 by a tilting device 18 by means of which the torch 12 can be adjusted to a desired angular position with respect to a work piece (not shown).

As it can be further seen from FIG. 1, the torch carriage 10 is movably supported on rails 22 and guiding by pairs of lateral guiding rollers 20 and by vertically arranged guiding rollers 21 from which only one is illustrated in the drawing.

The rails 22 are secured to a top side and to an under side, respectively, of a horizontally directed cantilever arm 24 of the flame cutting machine; in this manner, the torch carriage 12 can be displaced in opposite horizontal directions along the cantilever 24.

The drive of the torch carriage 10, namely its displacement along the cantilever arm 24 is effected by means of a steel band 26 which at one end thereof is connected to a clamping device 30 which secures the band to the carriage; the under side of the band 26 abuts against the face of a guiding roller 28 so that by moving the band 26 the entire carriage 10 can be displaced in a horizontal direction.

In a common tubing 32 are disposed control and feeding conduits for a driving motor 34 (FIG. 2) which as it will be explained later moves the cutting torch 12 in opposite upright directions. The electrical connection between the motor 34 and the cable 32 is effected through a guick-locking connector.

Figure 2:
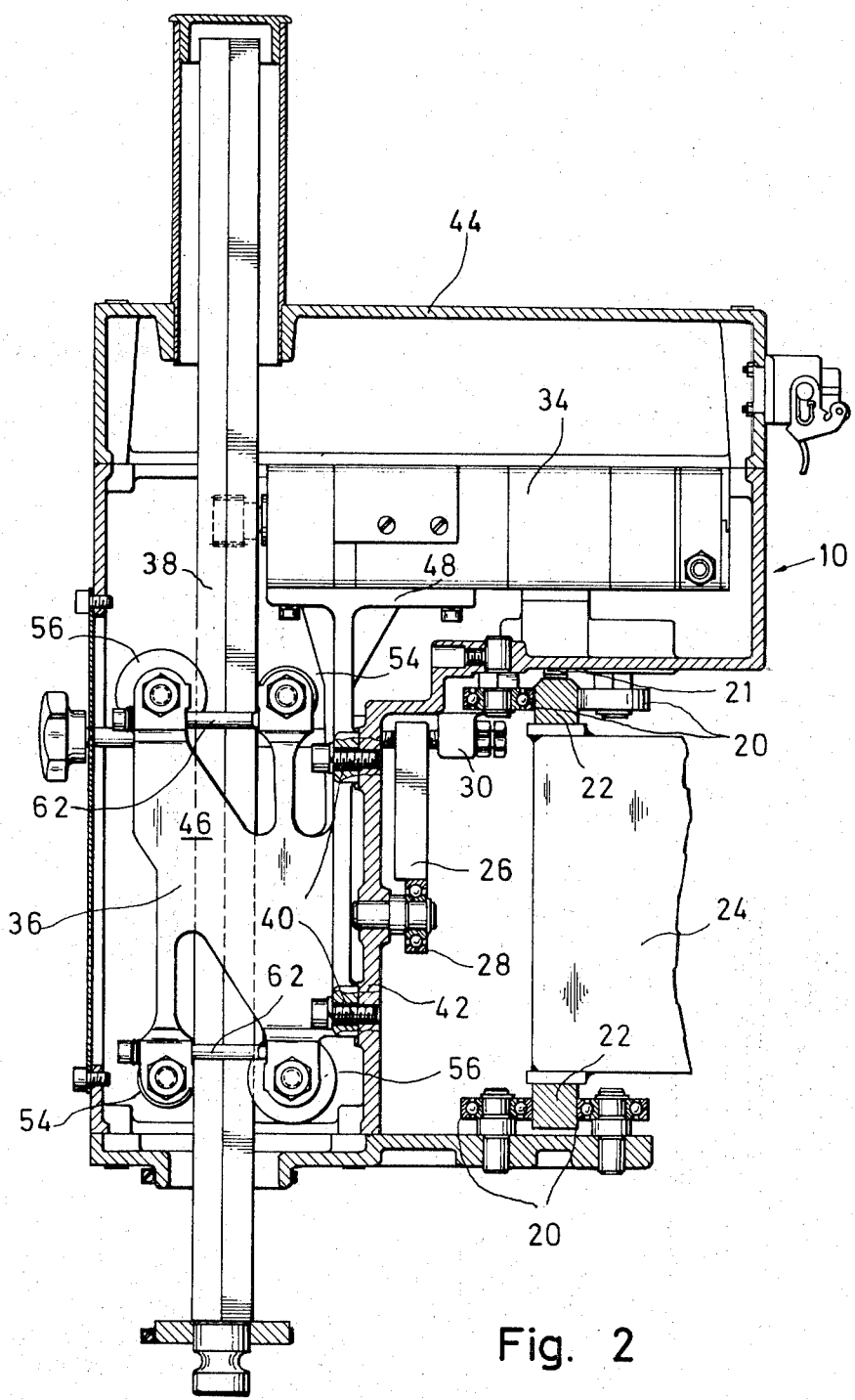
FIG. 2 is a sectional view of the carriage of FIG. 1.

FIG. 2 shows the torch carriage 10 in its cross-section. The torch carriage 10 has an L-shaped configuration and its housing serves essentially for receiving the above mentioned driving motor 34, the frame 36 and the elongated guard bar 38; according to one feature of this invention these parts are assembled into a single structural unit. The frame 36 is disconnectably secured by screws 40 to the upright section 42 of the L-shaped carriage 10. The horizontal section of the carriage is provided with a removable cover 44 covering a top opening of the housing so that after the removal of the cover 44 the structural unit 34, 36 and 38 can be inserted from above into the housing. Subsequently, as it has been already mentioned above, the frame 36 is secured to the housing by screws 40 and, if necessary, adjusted so that the guard bar 38 and thereby the cutting torch which is secured to the lower end of the bar, is directed perpendicularly to a work piece support.

Figure 3:
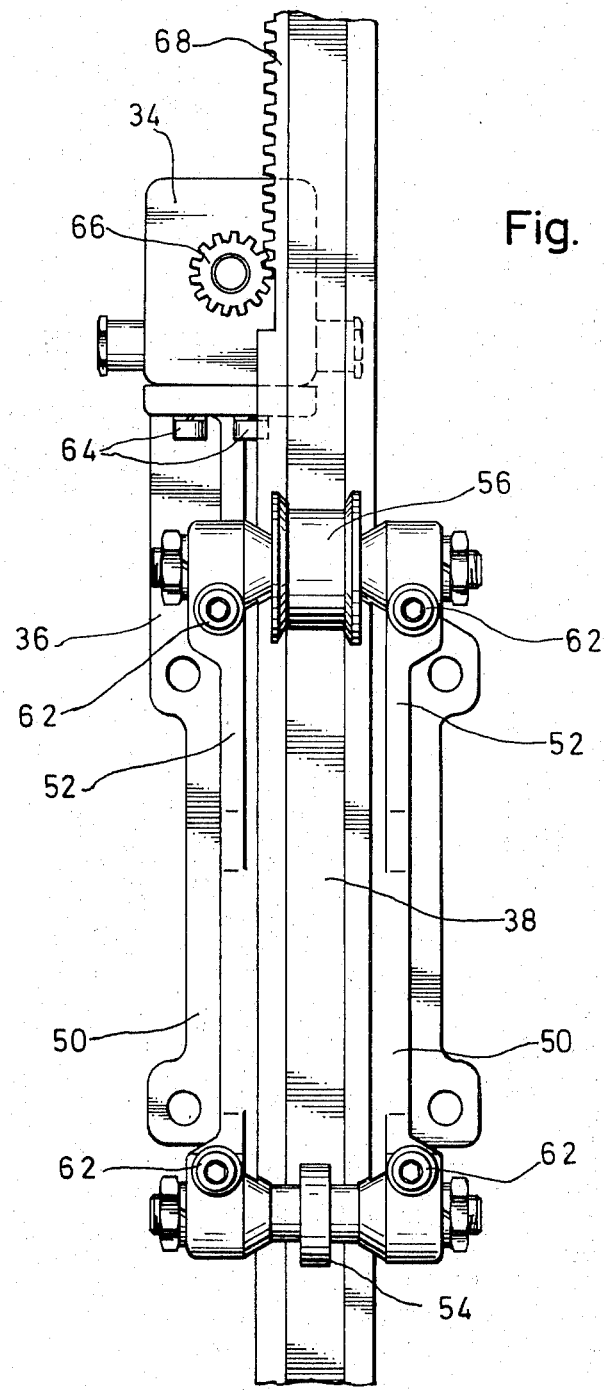
FIG. 3 is a front elevation view of a guiding frame of the structural unit of this invention.
Figure 4:
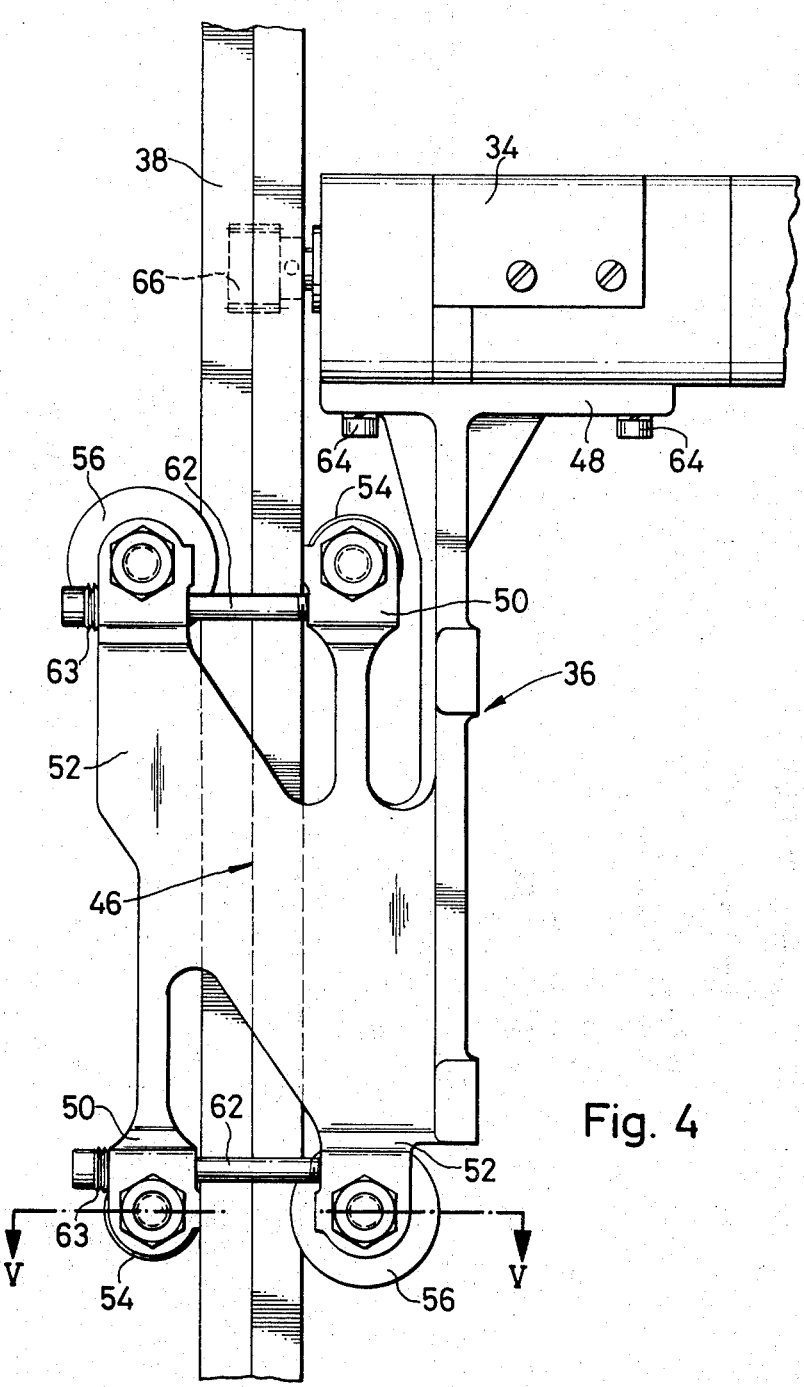
FIG. 4 is a side view of the structural unit of FIG. 3.
Figure 5:
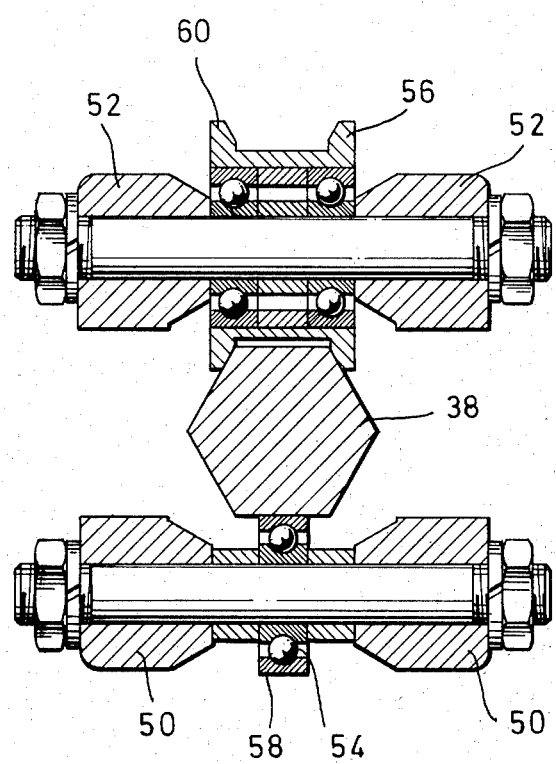
FIG. 5 is a sectional plane view of the guiding frame of FIG. 4 taken along the section lines V—V.

FIGS. 3 to 5 show in detail the structural unit 34, 36 and 38 according to this invention. Referring particularly to FIG. 4, the guiding frame 36 is made as one piece, preferably by casting, and defines two sections, namely a guiding part 46 and a supporting plate 48. The guiding part 46 has a substantially Z-shaped configuration with two parallel arms connected by a reinforced diagonal part; the ends 50 and 52 of each arm are bifurcated and provided with guiding rollers 54 and 56 which are in rolling contact with opposite sides of the guard bar 38, thereby movably holding and guiding the same in the upright direction. As it can be also seen from FIG. 4, the ends 50 support rollers on a smaller diameter with respect to rollers 56. The faces of rollers 50 are in full contact with one side of the guard bar 38 whereas the opposite rollers 56 at the ends 52 have an increased diameter and are provided with a circumferential groove which at least partially embraces the facing side of the guard bar 38.

In this manner, the guiding part 46 of the frame 36 includes two opposite paris of guiding rollers 54 and 56 of different diameter whereby the diagonally opposite rollers are of the same size. The assymmetrical arrangement of the guiding rollers 54 and 56 is shown in cross-section on an enlarged scale in FIG. 5. In this embodiment, the smaller rollers 54 have a straight peripheral face 58 which is in full contact with the flat side of a hexagonal guard rod 38. The larger guiding rollers 56, in contrast, are provided with a peripheral groove 60 embracing partially the opposite side of the hexagon 38 whereby lateral walls of the groove are in contact with sloping surfaces of the hexagonal rod. Due to this lateral guiding of the rod 38 within the groove of the guiding roller 56, there is avoided any possibility of lateral displacement during the upright movement of the guard rod 38.

Upon assembling the structural unit outside the torch carriage 10, namely upon inserting the guard rod 38 into the guiding part 46 of the frame 36, it is frequently desired that the production tolerances be compensated. For this purpose, the two facing ends 50, 52 of the arms of the guiding part 46 are connected with adjusting screws 62. Upon turning one or more of these screws, the relatively thin parallel arms of the Z-shape are bent towards or away from the relatively thick ends 52 and in this manner the desired distance between the facing guiding rollers 54 and 56 can be accurately adjusted. Such an adjustment, of course, can be made only within the limits of elasticity of the material employed so that relatively thin parallel arms of the Z-shape be not damaged; nonetheless, the displacement with the elastic limits of the material is fully sufficient for securing a reliable adjustment of the facing guiding rollers. Apart from the adjustment of production tolerances and in order to secure a reliable and free-from-play guiding of the guard bar 38 -it is also necessary that the guiding part 46 be also adjusted in response to wear effects. Such an additional adjustment is effected automatically be means of plate springs 63 abutting against screw connections 62 and exerting a constant resilient pressure against the guiding rollers.

As it has been already mentioned, in addition to the guiding part 46 the frame 36 includes also a supporting plate 48. The supporting plate, in contrast to the parallel arms of the guiding part, is arranged at a right angle to the guard bar 38, that is, horizontally when installed within the torch carriage 10. The supporting plate 48 supports a driving motor 34 which is secured thereto by screws 64. The driving motor 34 is connected by conduits arranged within the tubing 32 to a controlling device and to a power source (not shown in the drawings).

The shaft of the driving motor 34 is provided with a toothed pinion 66 which engages the guard bar 38 and in response to the direction of rotation of the controlled driving motor 34, it moves the guard bar vertically upwardly or downwardly. The lower end of the guard bar 38 projects downwardly through the torch carriage 10 and supports the cutting torch 12 so that by the vertical movement of the guard bar 38, the position of the cutting torch 12 with respect to a work piece can be adjusted as desired. To insure a reliable transmission of the rotational movement of the motor to the straight vertical movement of the guard bar 38, a surface portion of the side of the guard bar 38 which faces the pinion 66 is shaped as a toothed rack 68 which gears with the pinion 66.

The structural unit of this invention as mentioned above, can be in a very simple manner assembled outside the torch carriage 10 and installed into the torch carriage as a single unit and disconnectably mounted thereto.

In contrast to prior art embodiments, there is avoided the troublesome assembly work within the torch carriage itself which hitherto has required a considerable amount of time. After the insertion of the structural unit 34, 36 and 38 into the carriage it is only necessary to attach the cutting torch at the lower end of the guard bar 48 and connect the torch to feeding devices.

I wish it to be understood that I do not desire to be limited to the exact details of construction shown and described, for obvious modifications will occur to a person skilled in the art.

Having this described the invention, what I claim as new and desire to be secured by Letters Patent is as follows:

1. A flame cutting machine having at least one torch carriage, a guiding track for supporting and guiding said carriage and a movable elongated member carried by said carriage and adapted for supporting a cutting torch, comprising in combination, a guiding frame movably connected to said elongated member, a drive motor connected to said guiding frame in driving connection with said elongated member, said elongated member, guiding frame and said motor forming a single structural unit which as a whole is insertable into and, respectively removable from, said torch carriage.

2. A flame cutting machine according to claim 1 wherein said torch carriage includes a housing having a removable cover, said structural unit being insertable into said housing.

3. A flame cutting machine according to claim 1 wherein said guiding frame is disconnectably secured to said torch carriage.

4. A flame cutting machine according to claim 1, said elongated member defining two opposite surfaces, said guiding frame including a guiding part for movably holding portions of said opposite surfaces and for guiding said elongated member uprightly, and a supporting part for mounting said drive motor.

5. A flame cutting machine according to claim 4, said guiding part of said guiding frame including two arms facing said opposite surfaces of said elongated member, and the free ends of each arm being provided with rollers in movable contact with portions of said opposite surfaces.

6. A flame cutting machine according to claim 5, said guiding part of said guiding frame having a substantially Z-shaped configuration, whereby the ends of parallel arms of the Z-shape support said rollers.

7. A flame cutting machine according to claim 5, further including adjustment means operable for setting the mutual position of the facing rollers of said guiding part.

8. A flame cutting machine according to claim 5 wherein the face of at least one roller on each arm has a groove embracing at least partially portions of the opposite surfaces of said elongated member.

9. A flame cutting machine according to claim 1, said elongated member having a hexagonal cross-section.

10. A flame cutting machine according to claim 9, a surface portion of said elongated member being provided with a toothed rack and said driving motor including a pinion in engagement with said toothed rack.

* * * * *